No. 700,225. Patented May 20, 1902.
G. P. NEAL.
AUTOMATIC UNHITCHING DEVICE FOR ANIMALS, AND FIRE ESCAPE AND EXTINGUISHER.
(Application filed Aug. 7, 1901.)
(No Model.) 2 Sheets—Sheet 1.
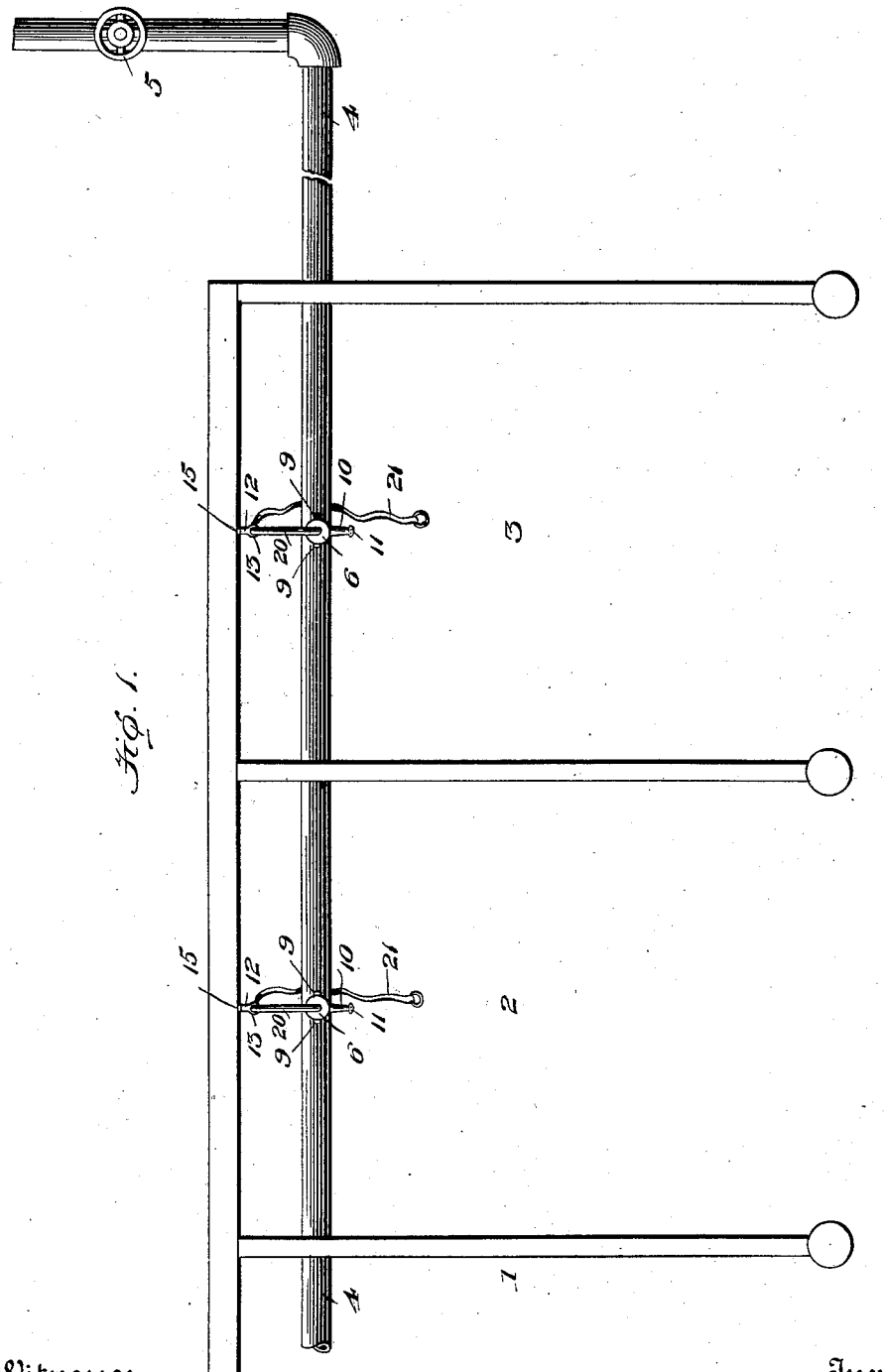

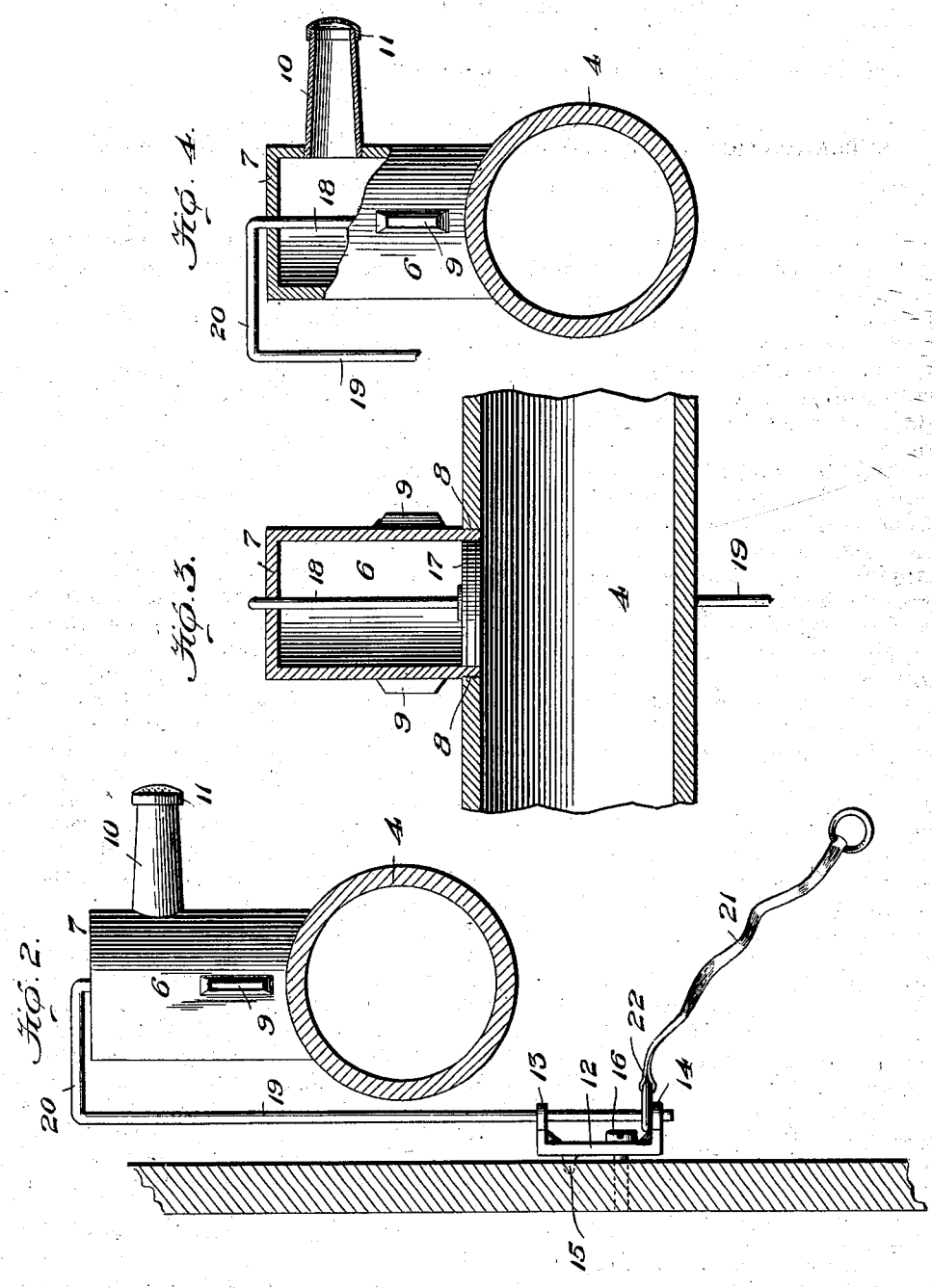

UNITED STATES PATENT OFFICE.

GEORGE P. NEAL, OF EVANSVILLE, INDIANA.

AUTOMATIC UNHITCHING DEVICE FOR ANIMALS, AND FIRE ESCAPE AND EXTINGUISHER.

SPECIFICATION forming part of Letters Patent No. 700,225, dated May 20, 1902.

Application filed August 7, 1901. Serial No. 71,235. (No model.)

*To all whom it may concern:*

Be it known that I, GEORGE P. NEAL, a citizen of the United States, residing at Evansville, county of Vanderburg, State of Indiana, have invented certain new and useful Improvements in Automatic Unhitching Devices for Animals, and Fire Escapes and Extinguishers, of which the following is a specification.

My invention relates to combined automatic unhitching devices for animals, and fire escapes and extinguishers.

The object of the invention is to provide certain improvements in that class of devices operated automatically by water-pressure to release or unhitch animals, such as horses in stalls, and project water on the animals and to parts of the stable.

It is the object of the present invention to provide a device of the character described which will consist of few and simple parts, adapted for certainty of action whenever intended for use, and which will perform its offices in a highly-satisfactory manner.

Having the foregoing objects in view, the invention consists of a device of this character comprising a supply-pipe, a cup or cylinder connected thereto and provided with a nozzle adapted to direct water on the animal and the stall, an improved fastener for the halter, and a novel arrangement of a movable piston in the cup and other parts connecting the same and the halter, whereby on the water-pressure acting on the piston the halter will be detached, so that the animal will be released and the water will thereafter be sprayed upon the animal and the stall.

The invention is described in detail hereinafter, and the novel features are recited in the appended claims.

In the accompanying drawings, Figure 1 is a plan view illustrating how my invention is applied to a row of stalls; Fig. 2, a detail view of the mechanism in vertical elevation; Fig. 3, a vertical section, and Fig. 4 a section taken at right angles to Fig. 2.

Referring to Fig. 1, 1, 2, and 3 represent stalls of ordinary construction.

The numeral 4 designates a water-supply pipe which runs at right angles to the stalls at the front thereof and may be provided with a suitable valve 5, located at any desired point in the stable or barn or elsewhere, by which the water is cut off from or allowed to flow into the supply-pipe.

The numeral 6 designates a cup or cylinder which is closed at its upper end 7 and has its lower end open and provided with screw-threads 8, by which it can be screwed into the pipe 4 wherever the same may be tapped by screw-threads. In practice this will be accomplished by providing lugs 9 to afford a bite for a wrench when screwing the cup into the pipe 4, and the cup will be so located in reference to the front wall of the stall that a nozzle 10, which is located on the cup adjacent the top thereof and extending at right angles thereto, will be in convenient position to direct the water on the head and breast of the animal. By preference I provide the mouth of the nozzle with a cap 11, provided with a number of apertures, so that the water will issue from the nozzle in a spray.

The numeral 12 designates a halter-ring holder, consisting of a U-shaped bracket arranged vertically, having the vertically-opening eyes 13 and 14 and being provided with a steady-pin 15 and secured to the front stable-wall by a bolt 16.

The numeral 17 designates a piston or plunger movable in the cup or cylinder, to which is connected in a rigid manner the stem or rod 18, running through the head 7.

The numeral 19 designates a locking-rod which is slidable through the eyes 13 and 14 and connected by a cross-rod 20 to the piston-rod. The joints of the rod 20, with rods 18 and 19, are rigid, in consequence of which every movement of the piston will be represented by a corresponding and equal movement of the rod 19.

The numeral 21 designates a halter having a ring 22, through which which the rod 19 is adapted to pass to secure the halter and the animal.

The operation is as follows: If for any reason—such as fire, for instance—it is desired to release the animals, the valve is opened, whereupon the water-pressure will enter pipe 4 and exert itself against piston 17, promptly pushing the latter upward in the cup and drawing out the rod 19 from the ring 22, whereupon the animal will be released. Immediately after this is done and the piston has passed the nozzle 10 the water-pressure will pass through said nozzle and issue in the form of a spray, which, owing to the position of the nozzle, will be directed against the head and breast of the animal, tending to keep the latter cool, as also to drive him from the stall. At the same time the stall is sprayed and any fire in the vicinity checked to a certain extent. It is clear that after the pressure has been removed the piston will sink and the halter can be again attached. Although it is clear that the invention is especially adapted for use at times of fire, it can of course be utilized for unhitching purposes only and in other connections. One or more of the devices can be used, according to conditions, and the position in relation to the stalls and the animals can be varied from what has been described.

Having thus described my invention, what I claim as new, and desire to secure by Letters Patent, is—

1. In a device of the class described, the combination with a cup or cylinder having a nozzle, and means for delivering water-pressure to said cup, of a piston movable in said cup or cylinder in response to the pressure, a piston-rod secured to the piston, a locking-rod rigidly connected to the piston-rod, outside the cup or cylinder and a halter-ring holder through which the locking-rod passes, said locking-rod being adapted to secure the halter, the nozzle being so disposed that the piston passes the opening in same and permits the flow of water after the halter-ring has been unlocked.

2. In a device of the class described, the combination with a water-supply pipe, of a cup or cylinder having a nozzle and having its outer end closed and being screw-threaded to the pipe at its other end and provided with lugs whereby it can be screwed into position, a halter-ring holder having eyes, a piston movable in the cup or cylinder and a piston-rod connected to the piston, a locking-rod slidable through the eyes and a cross-rod rigidly connected to the piston-rod and the locking-rod, said parts being so disposed and related that the water-pressure lifts the piston and moves the locking-rod and after the piston has passed the nozzle the water-pressure flows out therefrom.

In testimony whereof I hereunto affix my signature in presence of two witnesses.

GEORGE P. NEAL.

Witnesses:
  MAY ROBERTS,
  LOTTIE E. NEAL.